United States Patent [19]

Allen

[11] Patent Number: 4,739,377

[45] Date of Patent: Apr. 19, 1988

[54] CONFIDENTIAL DOCUMENT REPRODUCTION METHOD AND APPARATUS

[75] Inventor: James D. Allen, Rochester, N.Y.

[73] Assignee: Eastman Kodak Company, Rochester, N.Y.

[21] Appl. No.: 917,921

[22] Filed: Oct. 10, 1986

[51] Int. Cl.$^4$ .............................................. G03G 21/00
[52] U.S. Cl. ........................................... 355/133; 355/6
[58] Field of Search ..................................... 355/6, 133

[56] References Cited

U.S. PATENT DOCUMENTS

| | | | |
|---|---|---|---|
| 3,831,007 | 8/1974 | Braun | 235/61.11 E |
| 3,878,367 | 4/1975 | Fayling et al. | 355/133 |
| 3,977,785 | 8/1976 | Harris | 355/133 |
| 4,118,122 | 10/1978 | Rees et al. | 355/77 |
| 4,176,945 | 12/1979 | Holzhauser et al. | 355/14 |
| 4,179,212 | 12/1979 | Lahr | 355/14 R |
| 4,251,154 | 2/1981 | Russel | 355/14 TR |
| 4,308,327 | 12/1981 | Bird et al. | 430/15 |
| 4,451,137 | 5/1984 | Farley | 355/14 R |
| 4,477,176 | 10/1984 | Russel | 355/14 TR |
| 4,486,090 | 12/1984 | Warhol | 355/133 |
| 4,533,237 | 8/1985 | Stockburger et al. | 355/133 |
| 4,586,811 | 5/1986 | Kubo et al. | 355/14 R |
| 4,588,286 | 5/1986 | Stockburger et al. | 355/40 |
| 4,603,970 | 8/1986 | Aota et al. | 355/133 |

FOREIGN PATENT DOCUMENTS

WO85/01129 3/1985 PCT Int'l Appl. .
2139955 11/1984 United Kingdom .

OTHER PUBLICATIONS

Classified Documents Invisibly Encoded to Frustrate Unauthorized Duplication, by Peter Custer, Oct. 1, 1985.

Primary Examiner—Patrick R. Salce
Assistant Examiner—Jeffrey Sterrett
Attorney, Agent, or Firm—Norman Rushefsky

[57] ABSTRACT

A reproduction method and apparatus provides for the secure reproduction of confidential documents that include a machine readable code or indicia that is preferably invisible. The reproductions are also provided with a machine readable code to provide security against the making of reproductions from copies from originals. The method and apparatus of the invention comprises a multicolor development station reproduction apparatus wherein one or more color development stations are employed to reproduce the visual portions of the original document. The invisible encoded portions of the document are electronically "read" from the original and reproduced in the same reproduction apparatus with a developer station having transparent toner particles incorporating an ultraviolet fluorescent ink or composition.

14 Claims, 6 Drawing Sheets

CONFIDENTIAL DOCUMENT REPRODUCTION METHOD AND APPARATUS

BACKGROUND OF THE INVENTION

1. Field of the Invention

This invention relates to a reproduction system for maintaining the security of confidential documents and their reproductions.

2. Description of the Prior Art

In many fields, there is a need for huge quantities of information to be quickly exchanged between numbers of people. For this purpose, copying machines for copying documents, such as electrophotographic copying apparatus, and information transmission and recording apparatus, such as facsimile apparatus, have been developed and are widely used. At present, there are substantially no difficulties in making copies from ordinary documents. On the other hand, the development of copying apparatus and facsimile apparatus has brought about a new problem that confidential documents, for instance, new product planning documents, market research documents, diplomatic confidential materials or military confidential materials, are secretly copied without difficulty and those copies are stolen.

Under such circumstances, several methods of preventing reproduction of confidential documents by conventional electrophotographic copying machines have been proposed.

In this regard, a reproduction security system has been proposed wherein an "invisible" bar code is provided on the confidential document and the ability to copy same is controlled through the use of an encoded ID card containing a scrambled personal identification number in machine readable form and key pad for allowing the operator to input the personal identification number. The system is adapted to "read" the security code on the document, compare the card and key pad inputs to confirm the identity of the operator and to make encoded "blank" sheets of paper only if the operator's security clearance matches that indicated on the document. The use of encoded blank sheets prevents unauthorized reproductions made from copies of the original confidential document if copied on a similarly controlled copier. All of this is done on a separate dedicated xerographic printer machine that is not itself an image duplicator. Using this machine a fluorescent invisible data encoding is provided to blank sheets of paper for use in subsequent typing, printing or xerographic copying of confidential documents. When reproduction of confidential documents is to be done, encoded "blank" paper is obtained from this machine and the paper used promptly in a xerographic copier to reproduce the original document. The copier is provided with means to compare the encoding on the blank sheets with that on the original before copies of same can be made. The machine logic may be similar to that of the printer in requiring the operator to prove his/her identity. In addition, the copy sheets may be provided with time of encoding to ensure that the "blank" copy paper is used promptly; i.e., the copier can be made to shut down when "stale" encoded copy paper is used for making copies of secure documents.

It is one object of the invention to improve upon the security systems of the prior art. For example, in the recited prior art system documents encoded with different security levels may be required to be copied in the same order of their respective encoded blank copy paper. Care would thus need to be exercised to maintain the order of copying with the order in which the "blank" encoded paper was produced. Any mixing would prove a problem since the encoding on the blank sheets are not visible. Furthermore, extra time and space is wasted in having to move from printer to copy machine.

SUMMARY OF THE INVENTION

A method and apparatus for reproducing a confidential document having a visible image and an invisible image comprises machine reading of the invisible image to produce signals responsive to said reading and reproducing in an apparatus the invisible image as an invisible image on a receiver sheet and reproducing on the same apparatus the visible image as a visible image on the receiver sheet.

DESCRIPTION OF THE DRAWINGS

In the detailed description of the preferred embodiment of the invention presented below, reference is made to the accompanying drawings, in which.

DESCRIPTION OF THE PREFERRED EMBODIMENTS

Because apparatus of the type described herein are well known, the present description will be directed in particular to elements forming part of or cooperating more directly with the present invention.

Figure 1:
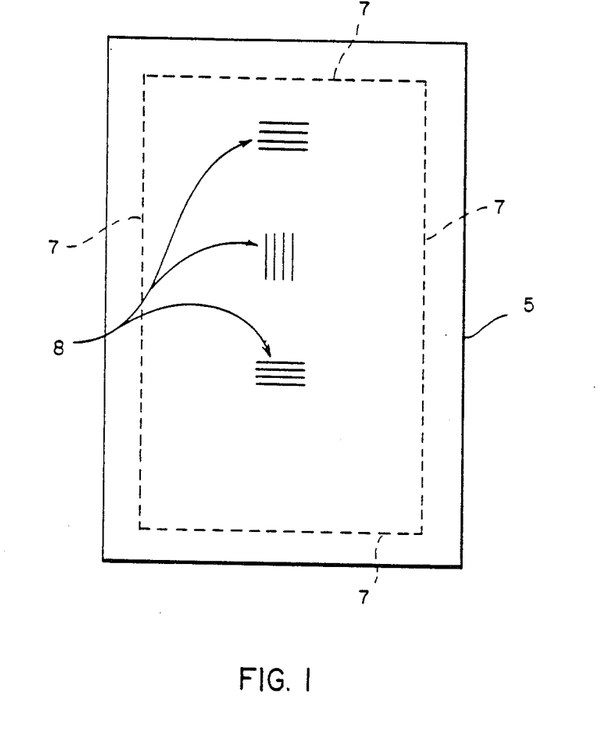
FIG. 1 is a diagram of an encoded confidential document to be copied in accordance with the method of the invention.

With reference now to FIG. 1, a confidential document sheet 5 to be reproduced includes an image area represented by the area surrounded by the dashed lines 7. Within the image area, there is located visible written or printed indicia (not shown) as is typical for a confidential document. Also located within the image area is an invisible bar code 8. The bar code may be in an ultraviolet (UV) active ink that is preferably visually transparent so as not to obliterate or mask the written or printed indicia located in the image area. The ink may also, if desired, be colorless to give no indication that it has been applied. The bar code may be provided at several locations in the area and, as shown, may be in different orientations so as to be detectable independent of document sheet orientation. As noted in U.S. Pat. No. 3,831,007, the contents of which are incorporated herein, the bar code may be, for example, of the known Delta Distance type, i.e., a code wherein distances between adjacent bars can be detected and comprise a binary representation. The binary representation in this case will be indicative of a security level of the document and/or document identification number. Obviously, other codes may be used. Thus, one desiring to copy this document must be able to demonstrate a security level clearance for copying this document as will be described with regard to the description of the controls for the reproduction apparatus of the invention.

Figure 2:
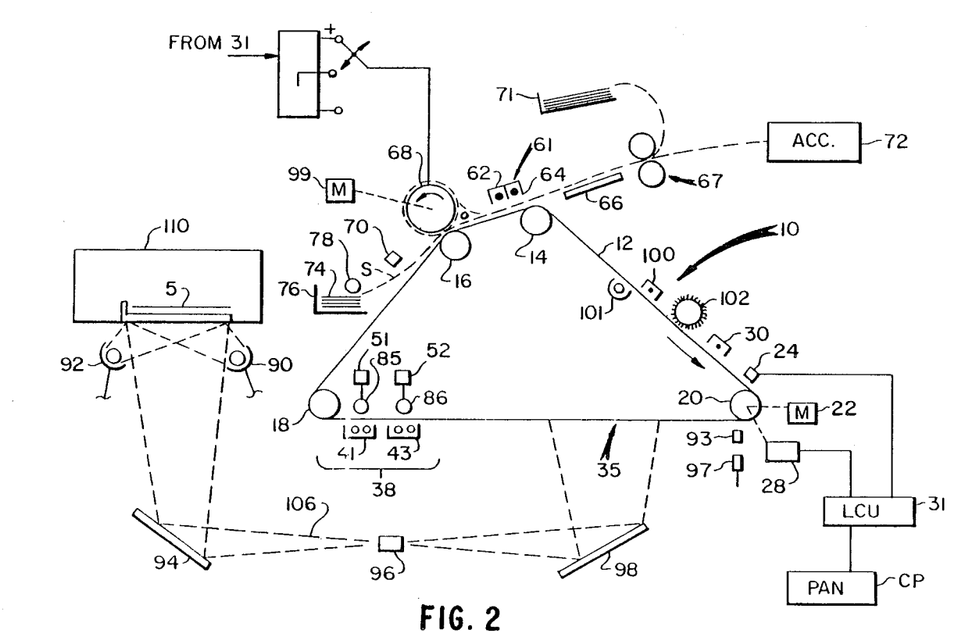
FIG. 2 is a schematic of a side view of apparatus embodying the invention.

With reference to FIG. 2, a schematic of an electrophotographic reproduction apparatus is shown.

The apparatus 10 includes a closed loop, flexible image transfer member, or photoconductive web 12. The web 12, is supported on rollers 14, 16, 18 and 20. The rollers are mounted on the apparatus' frame (not shown) with one of the rollers, for example, roller 20, rotatively driven by a motor 22 to effect continuous movement of the web 12 in a clockwise direction about its closed loop path. The web has a plurality of sequentially spaced, nonoverlapping image areas which pass successively through electrophotographic processing stations (charge, expose, develop, transfer, clean) located about the path of the web. The web also includes timing marks (or regularly spaced perforations) which are sensed by appropriate means, such as timing signal generator 24 to produce timing signals. Such signals are sent to a computer controlled logic and control unit (LCU) 31. The LCU 31 controls the entire electrophotographic process based on the instantaneous location of the web in the travel path. An encoder 28 associated with the roller drive motor 22 also produces timing signals for the LCU. The signals from the encoder cause the LCU to fine tune the process timing. The LCU 31 has a digital computer, preferably a microprocessor. The microprocessor has a stored program responsive to the input signals for sequentially actuating, then deactuating the work stations as well as for controlling the operation of many other machine functions.

Programming of a number of commercially available microprocessor such as one or more INTEL model 8086 microprocessors (which along with others can be used in accordance with the invention), is a conventional skill well understood in the art. This disclosure is written to enable a programmer having ordinary skill in the art to produce an appropriate control program for the microprocessor(s). The particular details of any such program would, of course, depend on the architecture of the designated microprocessor.

Figure 3:
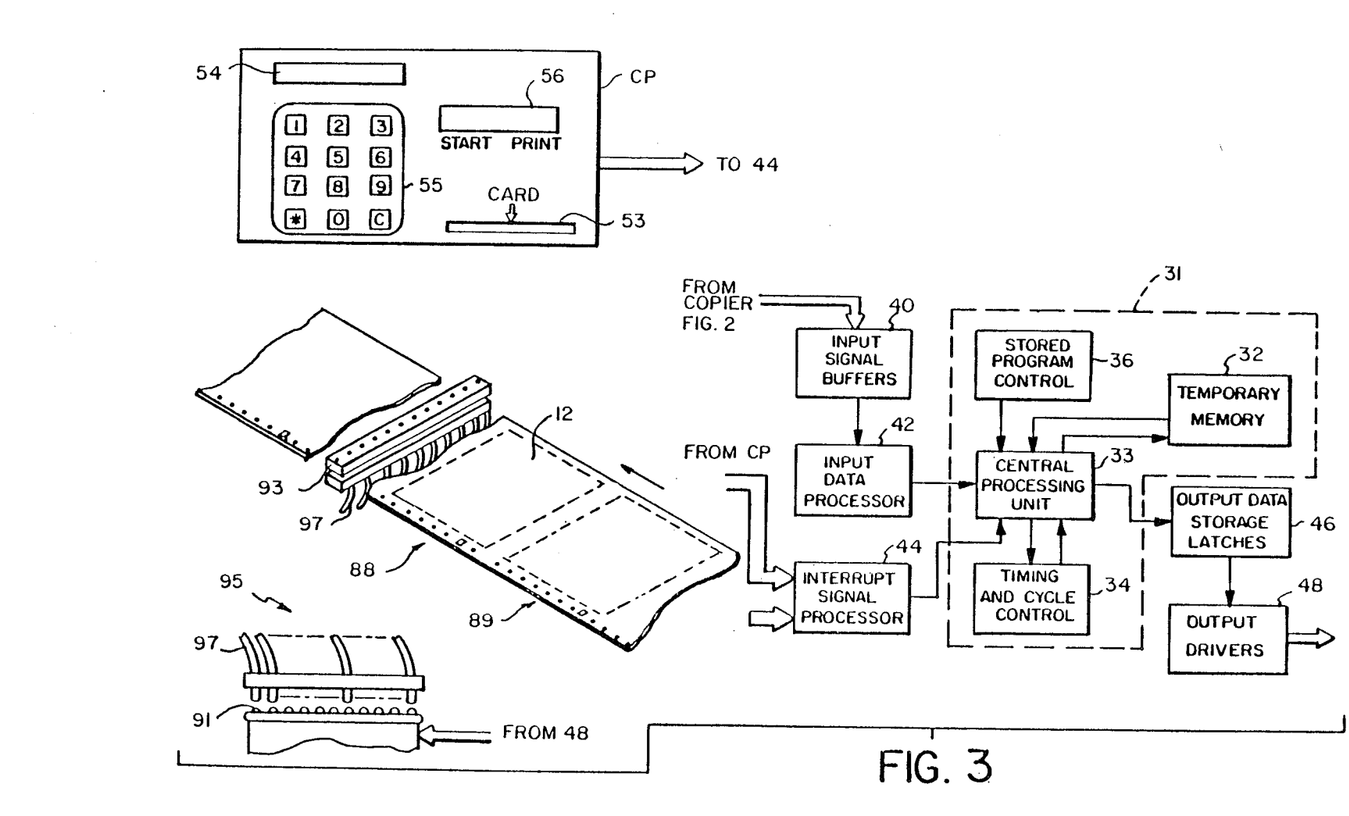
FIG. 3 and 3a are a schematic of apparatus and a control system embodied in the invention.

With reference also now to FIG. 3, a block diagram of logic and control unit (LCU) 31 is shown which interfaces with the apparatus 10. The LCU 31 consists of temporary data storage memory 32, central processing unit 33, timing and cycle control unit 34, and stored program control 36. Data input and output is performed sequentially under program control. Input data are applied either through input signal buffers 40 to an input data processor 42 or to interrupt signal processor 44. The input signals are derived from various switches, sensors, and analog-to-digital converters. The output data and control signals are applied to storage latches 46 which provide inputs to suitable output drivers 48, directly coupled to leads. These leads are connected to the various work stations, mechanisms and controlled components associated with the apparatus.

Figure 3A:
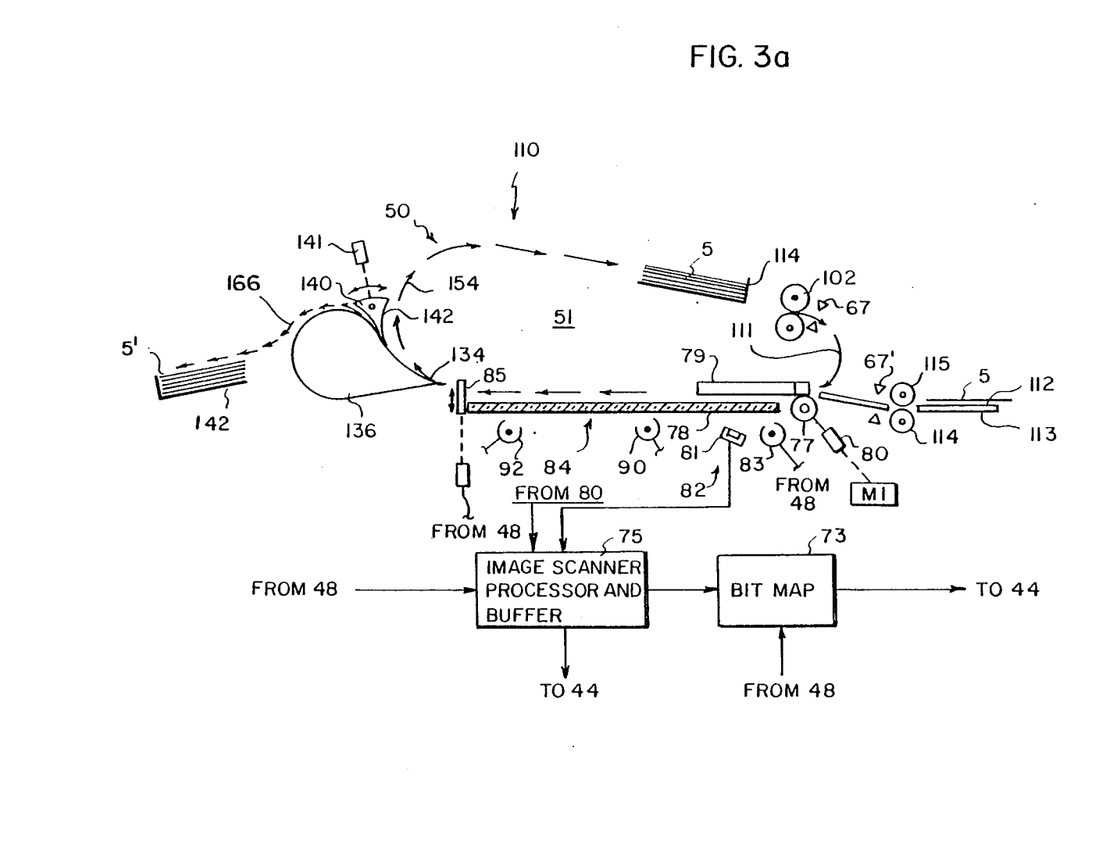
Figure 4:
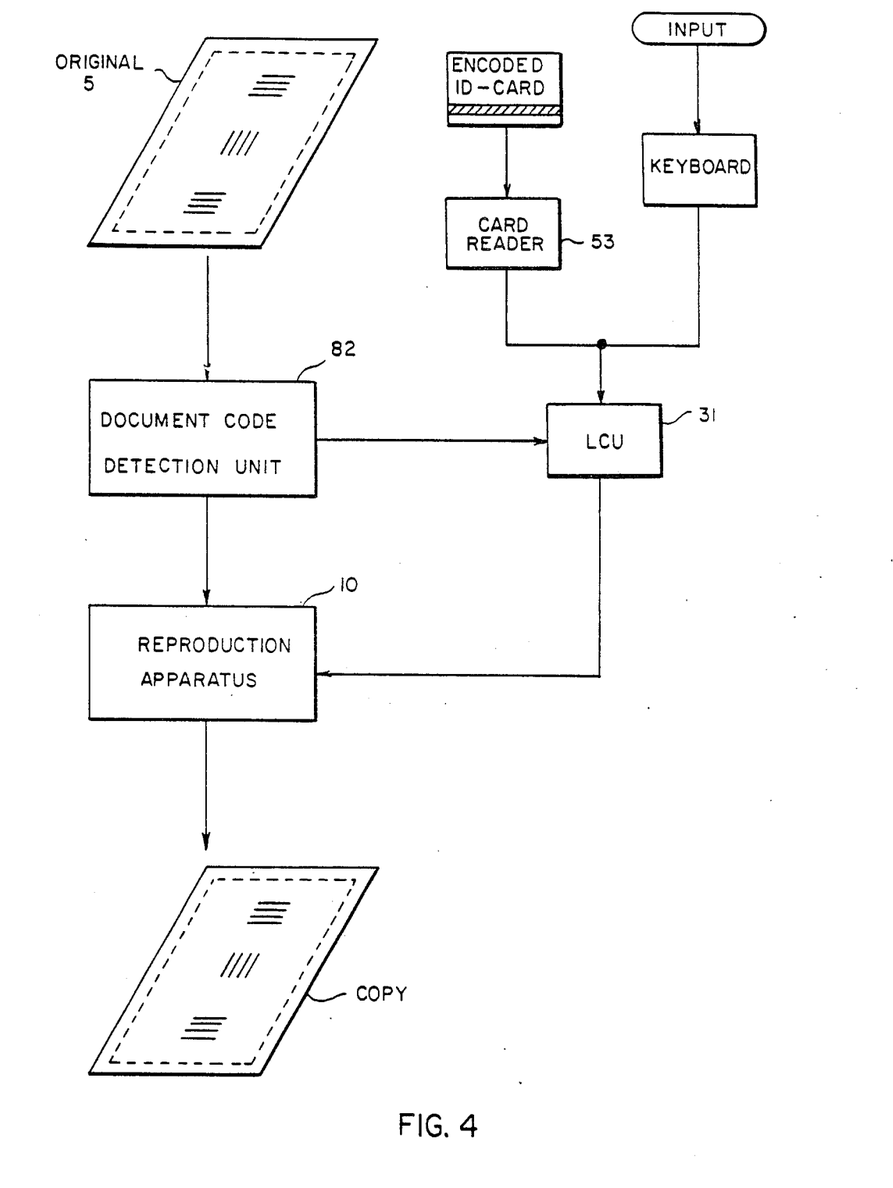
FIG. 4 is a flow chart describing aspects of the method and apparatus of the invention.

With reference now to FIG. 4, a schematic flow chart is provided illustrating a preferred method for reproducing a confidential document. The operator places an original document 5 as identified in the description for FIG. 1 onto a document sheet feeding apparatus 50 (see FIG. 3a) of the reproduction apparatus. The sheet feeding apparatus includes two modes of feeding a document which will be described in further detail below. The operator inserts an operator identification card or key that has encoded thereon a machine readable number that is scrambled but readable by a conventional card reader or key reader 53 that forms a part of control panel CP (see FIG. 3). The operator also inputs through a keyboard 55 on control panel CP the operator's identification number which is to be matched with that on the card to confirm the identity of the possessor of the card. This latter input may be in response to displayed instructions on an alpha-numeric display panel 54 indicating that the card reader has read the card. The inputs from the card reader and keyboard are fed through the interrupt signal processor 44 to the LCU which is programmed via stored program control 36 to compare the inputs and shut down the copier or prevent movement of the document to the exposure platen or inhibit any operating function which will prevent reproduction of that document if there is no match. In addition, an alarm may be provided and the document retained in a locked location where it is not accessible except to those providing security clearance identification to the apparatus as described above. Assuming a match, a document metering roller 77 (FIG. 3a) is driven to accept the document and advance the document toward the exposure platen 84. The copier logic is also changed to allow the operator to use the keyboard to input the number of copies and other exposure data. As the document 5 is driven towards the platen, a document code detection unit 82 is provided that includes a fluorescent aperture lamp 83 having a primarily ultraviolet light output directs a narrow beam of light onto the document. The document is driven by roller 77 between a glass plate 78 and a backing plate 79. The backing plate is comprised of fluorescent material so that the reflection from the plate is sensed by light sensor 81 having a row of photodiodes or other light sensors arranged transverse to the direction of movement of the document. As the leading edge of the sheet passes directly over the light sensor device, it will block the light sensor from "seeing" the fluorescent-containing backing plate and this signal is used to indicate the leading edge of the sheet. The drive motor M1 for the roller 77 includes an encoder 80 so that the position of any detected image on the sheet is known vis-a-vis its leading edge due to the fixed relationship between a stop 85 on the exposure platen and the location of the light sensor 81. The outputs from the encoder 80 and sensor 81 are provided to an image scanner processor and buffer 75. The sensors are arranged linearly across the transverse direction of the document sheet to scan the entire sheet as it is transported onto transparent glass platen 84.

As each line of the sheet is scanned, some of the sensors will detect UV illuminated areas directly above them and their respective signals will represent signals from areas having U.V. active or fluorescent ink as distinguished from signals of other sensors not detecting this ink. Circuitry using thresholding and/or comparator devices may be provided so as to distinguish U.V. active or fluorescent inked areas from areas on the document that are only somewhat reflective or excited by UV light. The signals from each scanner sensor is fed to the image scanner processor and buffer 75 which temporarily stores the signals from the photosensors that have been determined to be signals that represent fluorescent inked areas and which signals represent areas not possessing this ink. The scanning device is similar to conventional image scanners except that it is provided with a filter or sensors sensitive to a threshhold level of U.V. excited fluorescence or light of predetermined spectral content. Alternately, the ink may fluoresce in a particular spectral area such that the sensor will respond to that fluorescence as distinguished from its background. Sharp cut-off dyes exist such as Europium (III) thenolyl tri fluoroacetonate that will enable this action and will provide a measurable signal difference between the U.V. active ink and the sheet, even through some sheets may contain fluorescent whiteners. Signals representing each pixel or small area on the document and identifying it in binary format as to whether or not it is considered U.V. active are fed to a bit map memory storage array 73 which stores the signals. The image scanner processor and buffer 75 also feeds the encoded data that has been read from the document to the LCU to have same compared with the security level that forms a part of the data on the read operator identification card which is stored in temporary memory 32. After the document has been thus scanned, and there is a match between the encoded security level on the document and that on the card the document is stopped by a stop 85 provided at the edge of the platen, which positions the document sheet so as to be in register with image frames on the photoconductive web 12 during an exposure. If there is no match, the stop is removed by a suitable solenoid 85 through a signal from the LCU and caused to exit the exposure area, without a copy being made. In this instance, too, the exiting of the original may be made to a location that is only accessible to one holding appropriate security clearance.

As may be noted in FIG. 3a, the document sheet feeding apparatus includes a recirculating feeder 110 and document positioner 112 for feeding the document past the document code detection unit to the exposure platen 84. In one mode of operation of the apparatus 10, the document sheets 5 of a multisheet document are positioned in the tray 114 with the information to be copied facing upwardly, with the document sheets in their normal order, and with the topmost sheet being the first sheet of the document. Preferably, all of these sheets will be provided with an invisible bar code as described herein. A rotatable solenoid 141 which is connected to a sheet diverter 140 is energized in response to a signal from the LCU and rotates the diverter clockwise to the position illustration in FIG. 3a. Thereafter, in response to a signal from the LCU, the lowermost document sheet is withdrawn from the bottom of the stack in the tray 114 by means of an oscillating vacuum device (not shown) or other feeding device and fed through the path shown by the arrow 111, past the document code detection unit 82 and onto the exposure platen 84. Block or registration gate 85 stops and registers the document sheet at the exposure platen. After a document sheet is illuminated by platen exposure lamps 90, 92 (as will be described below), the block is withdrawn from the path of travel and the document sheet is then driven from the platen in the direction indicated by the arrows 134, 154 back onto the top of the stack of document sheets in the tray 114. This cycle continues until the required number of collated sets of copies has been made, as determined by a set counter (not shown) in the LCU.

FIG. 3a also illustrates the second mode of operation which uses the document positioner 112. When document sheets are to be copied by means of the document positioner 112, a document sheet is fed across tray 113, into the nip of rotating rollers 114, 115 which feed it to document metering roller 77. If, as indicated above, the operator's identification number input and card input match, the metering roller is actuated to feed the document sheet past the document code detection unit 82 and deliver it to the platen where it is registered by the block 85. After one or more copies of the document sheets are made, the block is raised and the drive rollers (not shown) drive the document sheet from the platen along the path indicated by arrows 134, 166. In this second mode, the solenoid 141 is de-energized and sheet diverter 140 is rotated counterclockwise to a position guiding the document sheet along the path 166 and the document sheet is delivered to a tray 142. Although the operation of the document positioner has been specifically described in connection with the copying of simplex original documents, it will be apparent that duplex documents can be copied by operating the apparatus as described in U.S. Pat. Nos. 4,176,945 and 4,451,137.

As noted above, during each of the two different feed modes, the original document sheet 5 is oriented, image side down, on transparent glass platen 84 that is supported by the copier frame. Exposure lamps 90, 92, such as xenon flash tubes, are located beneath the platen 84 within the frame. The lamps flood the document sheet with light and a reflected image of the document sheet is transmitted via mirror 94, lens 96, and mirror 98 in focus to an area 35 representing one image frame lying in the plane of the web 12. The timing of the flash of lamps 90, 92 is controlled by the LCU and related to the travel of the web 12 to expose adjacent, nonoverlapping areas of the web to the images of the document sheet. One or more corona charging units, exemplified by corona charger 30, is located upstream of the exposure area 35, and applies a uniform primary electrostatic charge, of say negative polarity, to the web 12 as it passes the charger and before it enters the exposure area. The photoconductive properties of the web cause the primary charge in the exposed areas of the web to be discharged in that portion struck by the exposure light. This forms latent imagewise charge patterns on the web in the exposed areas corresponding to the image on the document sheet. It should be appreciated that the properties of the ink used for bar coding are that it is substantially transparent, so that the image information thereunder is visible, and is of such a color that the photoconductor cannot distinguish it from a white background.

In accordance with the signals stored in the bit map 73, an electronic printer means 95 is provided to form on a second image frame of the web 12 an electrostatic image of the bar coded information provided on the original document. In addition, the LCU 31 through output drivers 48 inputs into the bit map 73 data representing the I.D. number of the operator, the date and time the copy is made and the location of the reproduction apparatus. This data is input into areas of the bit map where bar coding is not expected to be present, but preferably it will be used to print in an area of a copy sheet where visible information is expected to be present. Further discussion regarding this printer means will be described later. Thereafter, travel of the web then brings the areas bearing the two image frames into a development area 38. The development area has two magnetic brush development stations, one (41) containing a toner having visible pigmentation such as black, the other (43) containing a toner comprised of transparent beads or particles that have incorporated therein a fluorescent ink or substance that is substantially transparent to light in the visible spectrum. The toner particles are agitated in the respective developer stations to exhibit a triboelectric charge of opposite polarity to the latent imagewise charge pattern. Backup rollers 85, 86, located on the opposite side of web 12 from the development area, are associated with respective developer stations 41, 43. Actuators 51, 52 selectively move respective backup rollers into contact with the web 12 to deflect the web from its travel path into operative engagement with respective magnetic brushes. The charged toner particles of the engaged magnetic brush are attracted to the oppositely charged latent imagewise pattern to develop the pattern.

The logic and control unit 31 selectively activates an actuator in relation to the passage of an image frame that is to be processed with the respective color toner. Where the first image frame is to be developed with black toner and the second image frame is to be developed with the transparent fluorescent toner and as the image frame containing the image to be developed in black reaches the development station 41, actuator 51 moves the backup roller 85 to deflect the web so that the latent charge image is developed by attracting black toner particles from the station 41. As soon as the image area leaves the effective development area of the station 41, the actuator 51 returns the backup roller 85 to its nondeflecting position. A similar cycle is accomplished by the logic and control unit 31 for the development of the second image frame or sector containing only the bar coded and I.D. information with use of only the fluorescent toner from station 43. In this regard, actuator 52 and back-up roller 86 are employed.

The developed black and fluorescent toned image frames must be transferred to a receiver sheet in accurately registered superimposed relation to form a reproduction of the original document sheet having both the visible and bar coded information as well as the additional information noted above. Apparatus for providing such registered transfer are fully described in U.S. Pat. Nos. 4,477,176, issued Oct. 16, 1984 and 4,251,154, issued Feb. 17, 1981 in the name of Matthew J. Russel, the contents of which are incorporated herein by this reference. Briefly, this is accomplished by feeding a receiver sheet or support S of say plain paper, from a supply stack 74 stored in hopper 76, in synchronism with movement of the first image frame so that the receiver sheet engages the web and is registered by mechanism 70 with the first image frame. A transfer roller 68 includes a compliant insulating surface thereon and is biased to a potential suitable for transfer of the developed image on the first image sector to the receiver sheet S and to tack receiver sheet S to roller 68. Roller 68 is driven by a stepper motor 99 which receives actuating signals from the LCU 31.

Roller 68 may also be a biased vacuum roller or a roller with sheet clamping mechanisms to clamp the sheet to it.

Continued movement of web 12 and synchronized rotation of roller 68 brings the lead edge of the copy sheet back into transferable relationship with the web as the lead edge of the next toner image arrives at roller 68. At this point, the bias on roller 68 is reversed to repel sheet S away from roller 68 back into contact with web 12. Receiver sheet S will be carried by web 12 so that the receiver sheet is in registration with the image on the second image frame. This image is transferred to the receiver sheet by charger 61 including transfer charger 62 and detack 64. The copy sheet is separated from the web and conveyed by either vacuum transport or as shown air transport 66 to roller fuser 67 and then to exit hopper 71 or an accessory finishing unit 72. The use of the recirculating feeder as described above will provide for collated sets of copies where the multisheet document is arranged in collated order in tray 114 with the first sheet at the top and the sheets are fed one at a time from the bottom beginning with the last sheet in order of collation and returned back to the top. Depending upon the number of collated sets desired, each sheet will be recirculated once for each such copy set.

If desired, the recirculating feeder may have a top cover which prevents access to the original multisheet document after the copier is enabled to commence feeding of the sheets for making the first set of reproductions. Thus, a signal from a sensor indicating that the top cover to closed may be used is enable the feeder 110 to commence feeding of the document sheets upon pressing by the operator of the START PRINT button 56. This, of course, assumes that there is a match between the data on the card input by the operator and data input on the keyboard which are used to enable the START PRINT button in the recirculating feeder mode. As the sheets are fed seriatim from the bottom of the multisheet document, they are each driven first along the path shown by arrow 111. Roller 77 is driven and advances the sheet through the document code detection unit 82. The invisible encoded data is read by the unit and the sheet advanced to the exposure platen where it will be exposed and imaged onto the photoconductor as previously described. If the code on the document sheet indicates a required criterion for copying or security level clearance requirement that is higher than that of the operator the sheet is not copied and not stopped by stop 85 but is recirculated back to the top of the stack. The LCU may be programmed to stop the copying of any further documents upon detection of an unauthorized copying operation for any one sheet in the multisheet document and prevent opening of the top cover until someone with a security key opens the door and resets the copier for a new copying operation or otherwise provides a card and identification input that is of an appropriate security level for reproducing the rejected document.

With some scanners, it is possible to have the time for scanning of the document be longer than that for flash exposing of same at the exposure platen. To increase productivity while in the recirculating feeder mode, the LCU may be programmed to read the bit mapped version of the invisible code from bit map 73 for each document sheet during its first pass through and store same either in the temporary memory 32 or on a disc in association with the position count of the document from the bottom of the stack. As each of the documents comes through for its second and subsequent passes, they are not read by the document code detection unit 82 but instead are more quickly driven to the exposure platen for optical exposure and their encoded data is reproduced by the LED printer 95 using the data stored in the temporary memory or on the disc.

While the developed image is being fixed in fuser 67, the web 12 continues to travel about its path and proceeds through a cleaning area.

To facilitate toner removal from the web, a corona charging station 100 and a rear erase lamp 101 may be located upstream of a cleaning unit 102 to neutralize any charge remaining on the web and thus reduce the adherence forces of the toner to the web.

As may be noted from FIG. 3, numbers 88 and 89 identify the exposure of each of the image frames used for reproduction of document 5. The locations of the image frames are known based on conventional timing signals used for making the exposure onto each of the frames and registration of an edge of the original with the stop on the platen. As the second image frame 89 passes above the electronic printer signals from bit map 73 are inputted through interrupt signal processor 44 into the LCU with signals representing areas to be selectively erased on frame 89. These areas correspond to those that did not contain the bar code indicia on the original document 5. In addition, the erasure is selective so as to establish a charge representation of the I.D. information to be printed. The LCU in response to timing signals from the timing signal generator 24 and/or encoder 28 illuminates through output drivers 48 light emitting diodes (LED's) 91. The LED's may comprise a linear bank of LED arrays situated transverse to and proximate the web surface or as shown in FIG. 3, the array 95 of LED's 91 may illuminate the web via optical fibers 97, arranged at one end as a linear array, and gradient index lens array 93, such as a SELFOC (trademark of Nippon Sheet Glass Co., Ltd.) array which focuses light from the linear array of fibers onto the photoconductor 12. With the passage of image frame 89 over the electronic printer means, signals are provided to the LCU 31 from bit map 73 which provides an inverse logic operation to the information in the bit map. That is signals in the bit map corresponding to areas on the original that are not bar coded are outputted to the LCU for illumination of appropriate LED's to selectively erase all information on image frame 89 except for that to reproduce the bar code and I.D. information. The latent electrostatic image on image frame 89 is then developed with the transparent fluorescent toner at development station 43. As indicated above, the two developed image frames are transferred in register to the same surface of a support such as receiver sheet S. After fixing of the images to the sheet S a reproduction is provided of the original with invisible bar coding and I.D. information in accordance with that provided on the original and that input by the copier's I.D. printing.

While the invention has been described with regard to a flash exposure of a document, other types of exposure are also contemplated. For example, the image may be scanned upon the electrostatically charged photoconductor and may be imaged thereon using a scanning reflection exposure of the original or using light which has been electronically generated from, say, a bit stream. In the former, segments of the original are scanned by a light source and the light modulated by the document is imaged upon the photoconductor. In the latter (see FIG. 5 where the same numbers identify similar components to that described for the embodiment of FIG. 2), the information contents of a document are digitized into electrical signals by a suitable electronic image "reading" device 120 and these signals used to modulate a light source such as a laser or LED imaging source 125 which is then imaged upon the photoconductor. The photoconductor may be in the form of a web or drum and, as is known, different image frames may actually comprise the same areas of the photoconductor but the frames exist at different times.

Figure 5:
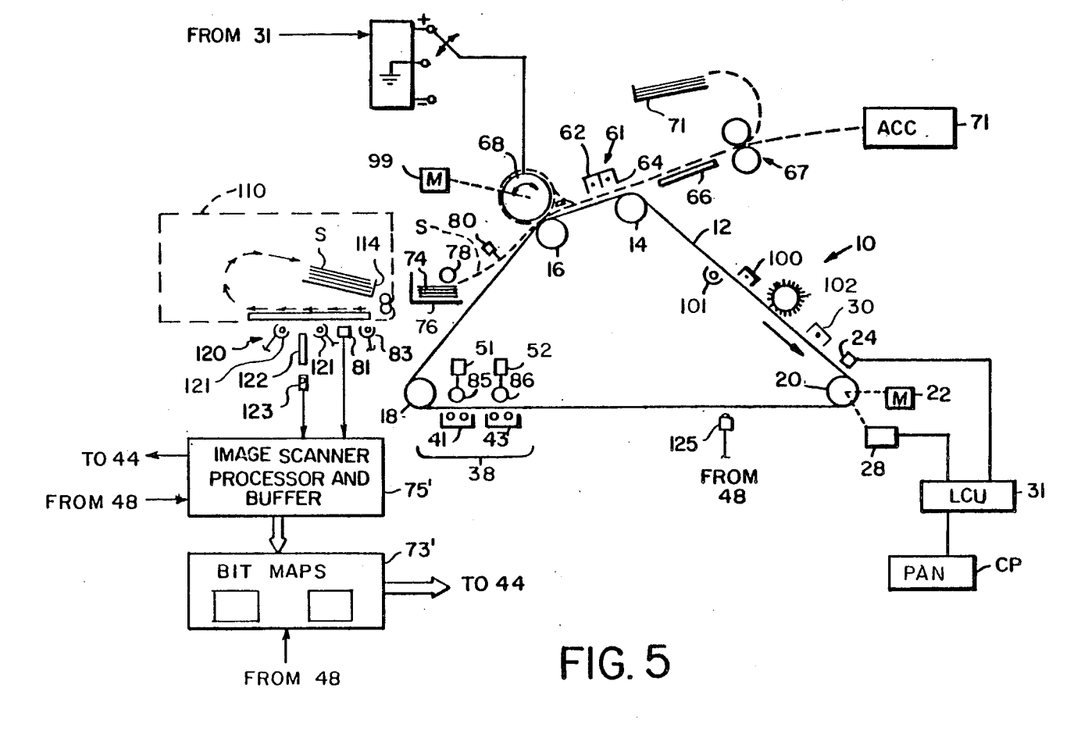
FIG. 5 is a schematic of a side view of another apparatus embodying the invention.

In the embodiment of FIG. 5, document 5 is part of a multisheet document supported as a stack in a tray 114 that forms part of a recirculating feeder that is of the type shown in FIG. 3a. As the document sheet is fed from the bottom of the stack to the document code detection unit 82, signals from LCU 31 illuminate lamp 83 to scan the document with a narrow beam of primarily ultraviolet illumination. The light sensor 81 sensitive to the fluorescence of the bar code detects the bar code and feeds this information to image scanner processor and buffer 75' for processing and storing in a first bit map in bit map memory storage array 73'. Additional I.D. information may be input through the control panel CP that includes the card reader 53 into areas of the first bit map specifically assigned to receive this information. The document sheet then moves and is again scanned by, for example, a separate source image reading device 120 that includes lamps 121, gradient index lens array 122 and photosensors such as conventional photodiodes arranged as in a charge coupled device (CCD) array 123. These signals are processed by image scanner processor and buffer 75' and stored in a second bit map array in bit map memory storage array 73' so that the second bit map now contains in binary signal format a bit mapped representation of the visible information. For exposure of each of the two image frames the information is conveyed to the LCU and selected LED's on the LED exposure array 125 illuminated to record only the information desired to be reproduced for each "color" toner. While separate scanning devices are shown in FIG. 5 the invention contemplates the use of a single scanner where in one mode the "invisible" bar coding may be read and in a second mode the image information on the entire document sheet may be read using filters, for example, to vary the spectrum of light to the scanner.

In the use of an electronic printer apparatus of FIG. 5 it is preferred to use a photoconductor and toning system that will attract toner particles to areas of the photoconductor that have been exposed. This is done since in most documents the background constitutes the major area of the document. For reproduction of the first image frame the LCU actuates the LED printer array 125 (which may include a gradient index lens array not shown) through drivers 48 to output a beam of light to expose each pixel size area for information to be reproduced in black as indicated by the binary signal stored in bit map 73'. Similarly, for exposure of the information to be reproduced with the transparent fluorescent toner on the second frame the signals from the LCU illuminate the LED printer array to "print out" only that information which is to be developed with this toner. Again, the binary signals indicating that a pixel is derived from a bar coded area is used to illuminate corresponding LED's for forming an image pixel on the photoconductor 12.

As described for the apparatus of FIG. 1, the image frames are developed with respective toners and transferred in register to receiver sheet S. When making multiple copies using a recirculating feeder, the visible and invisible data may be stored in bit mapped form in temporary memory 32 or on disc after a first reading and subsequent copies printed from memory to speed up the reproduction process. In this regard, the first reading may be made either prior to or during a production run wherein the first set of copies is being made and for the subsequent set of copies the document sheets need not be slowed up for reading by the reader but may be advanced to the platen either via a different path or by increasing the speed to the feeding rollers. There is thus provided a reproduction of the confidential document 5 wherein the reproduction contains both the visible image information of the original and the invisible information of the original.

While the apparatus of the preferred embodiment has been described as an electrophotographic reproduction apparatus, alternate printing techniques may include ink jet or other printing methods. Where original documents have visible multicolored information or it is desired that the original be reproduced in visible multicolors means may be provided such as by adding additional visible pigment containing development stations to create multicolored reproductions of the visible image information in accordance with known techniques. The preferred embodiments have been described with regard to ultraviolet active dyes; it will be appreciated, however, that other dyes sensitive to other spectra of light (such as infrared) but reasonably transparent to the visible indicia may also be used.

The preferred embodiment of the invention has been described in conjunction with the use of an invisible image, i.e., one not distinguished from background by the photoconductor. The advantage of this is that the security coded or otherwise machine readable information is printed over the information containing a portion of the document to present difficulties in masking or other manipulation of the coding to defeat the objectives of the security system. In the broader context of the invention, the invention contemplates that the encoded or machine readable image be located at say the marginal portions of the original document this image may be visible and the toner used in station 43 also may be made visible. In such a case, the LED exposure unit would be used to selectively erase the encoded image from frame 88 and print the encoded image on frame 89 so that it may be developed in a different color from that of the document image information so that the two image portions are distinguishable for reading by a machine or scanner.

The invention has been described in detail with particular reference to the preferred embodiment thereof, but it will be understood that variations and modifications can be effected within the spirit and scope of the invention.

I claim:

1. An apparatus for reproducing a confidential document sheet having a visible image and an invisible image, the apparatus comprising:
    reader means for reading the invisible image and generating signals responsive to said reading;
    first means in said apparatus responsive to signals from the reader means for reproducing the invisible image as an invisible image on a receiver sheet; and
    second means in said apparatus for reproducing the visible image as a visible image on said receiver sheet.

2. The apparatus of claim 1 and wherein the first and second means together include an electrophotographic member;
    means for forming on the member an electrostatic image of the visible image information;
    means for forming on the member an electrostatic image of the invisible image information in response to signals from the reader means;
    a first development station for developing the electrostatic image of the visible image with a material of visible pigmentation; and
    a second development station for developing the electrostatic image of the invisible image information with a material that is substantially transparent to the visible pigmentation.

3. The apparatus of claim 2 and further including means for comparing identification or security clearance of a user of the apparatus with the invisible image on the document in accordance with a predetermined criteria establishing authorization for use and disabling the apparatus from reproducing the document where the user is not authorized to reproduce the document.

4. The apparatus of claim 3 and including recirculating feeding means for feeding the document sheet from a support past said reader means and back to said support.

5. A method for reproducing a confidential document sheet having a visible image and an invisible image, the method comprising the steps of:
    machine reading the invisible image and generating signals in response to said reading; in response to said signals reproducing in an apparatus the invisible image as an invisible image on a receiver sheet and reproducing in said same apparatus the visible image as a visible image on said receiver sheet.

6. The method of claim 5 and including the steps of forming an electrostatic image of the visible image information on a photoconductive member;
    forming an electrostatic image of the invisible image information on the member in response to said signals; developing the electrostatic image of the visible image with a material of visible pigmentation; and
    developing the electrostatic image of the invisible image information with a material that is substantially transparent to the visible pigmentation.

7. The method of claim 6 and further including the steps comparing identification or security clearance of a user of the apparatus with the invisible image on the document in accordance with a predetermined criteria establishing authorization for use and preventing the reproducing of the document where the user is not authorized to reproduce the document.

8. The method of producing a plurality of copies of a multisheet confidential document, at least a plurality of sheets in said document having machine readable data for establishing a security copying criterion and visible information to be reproduced, the method comprising the steps of:
    (a) providing input signals by an operator representing data to be compared with the machine readable data on each of the said document sheets;
    (b) feeding seriatim each of the document sheets along a predetermined path past a device for reading the machine readable data on each of said document sheets and generating signals representative of the read data;
    (c) comparing the generated signals with those input by the operator;
    (d) if the data meets the criterion, forming on an electrostatic charge bearing member an electrostatic image using at least two separate image frames for each document sheet, one image frame containing an electrostatic representation of the visible information on the document sheet, and a second image frame containing an electrostatic representation of the machine readable data on the same document sheet;
    (e) developing the said one image frame with a visible pigmented toner and developing the said second image frame with a different toner; and
    (f) transferring the two toned image frames onto the same surface of a receiver sheet to form a reproduction of each of the document sheets of both the visible information and the machine readable data.

9. The method according to claim 8 and wherein the document sheets are fed seriatim from a support by a recirculating feeder, to the reader for reading the machine readable data, to an exposure platen for exposing an image of the visible information upon the member which comprises an electrically charged photoconductive member and back to the support.

10. The method according to claim 9 and wherein collated sets of reproductions of the multisheet document are produced by stacking the multisheet document in the support in collated order with the first sheet of the document being at the top and passing the sheets to the data reader device by conveying the sheets one-at-a-time from the bottom of the stack and returning them to the top of the stack after copying same.

11. The method according to claim 8 and wherein each of the document sheets is circulated past the reading device and back to a stack so that the encoded data on each document sheet is stored in a memory in association with the position of the document sheet in the stack.

12. The method according to claim 8 and wherein in each of the document sheets is circulated past the reading device during a production run for making a first copy of each document sheet and the machine readable data is stored in memory for use in reproducing the machine readable data during the same production run for making additional copies of the document sheets so that the device does not read the machine readable data during production of subsequent copies.

13. The method according to claim 8, 9, 10, 11 or 12 and wherein the machine readable data is substantially invisible to the photoconductor and an image thereof is not reproduced upon exposure of a document sheet to the electrostatic charge bearing member to reproduce only the visible information on said one image frame.

14. Apparatus for producing one or more copies of a document sheet, the document sheet having machine readable data for establishing a copying criterion and visible information to be reproduced, the apparatus comprising:
(a) first means for generating first signals in response to inputs by an operator of data to be compared with the machine readable data on the document sheet;
(b) second means for reading the machine readable data on the document sheet and generating second signals representative of the read data;
(c) third means for establishing a copying criterion and comparing the signals generated by the second means and those generated by the first means to determine if they meet the copying criterion and providing a third signal indicating the criterion is met;
(d) means responsive to the third signal for forming on an electrostatic charge bearing member an electrostatic image of the visible information that is on the document sheet and an electrostatic image of the machine readable data that is on the same document sheet;
(e) means for developing the said electrostatic image of the visible information with a visible pigmented toner and developing the electrostatic image of the machine readable data with a different toner; and
(f) means for transferring the two toned images onto a receiver sheet to form a reproduction of the document sheet of both the visible information and the machine readable data.

* * * * *